United States Patent
Wong et al.

(10) Patent No.: US 6,725,330 B1
(45) Date of Patent: Apr. 20, 2004

(54) ADAPTABLE CACHE FOR DISC DRIVE

(75) Inventors: Patrick Tai Heng Wong, Singapore (SG); Beng Wee Quak, Singapore (SG); YongPeng Chng, Singapore (SG); Wesley Wing Hung Chan, Singapore (SG); WeiLoon Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 683 days.

(21) Appl. No.: 09/649,106

(22) Filed: Aug. 25, 2000

Related U.S. Application Data

(60) Provisional application No. 60/151,203, filed on Aug. 27, 1999.

(51) Int. Cl.[7] .............................................. G06F 12/00
(52) U.S. Cl. ............................. 711/113; 711/129; 713/2
(58) Field of Search .................................. 711/113, 129, 711/123, 173; 713/2, 1

(56) References Cited

U.S. PATENT DOCUMENTS

| | | | | |
|---|---|---|---|---|
| 4,768,149 A | * | 8/1988 | Konopik et al. | ............... 710/47 |
| 4,954,951 A | | 9/1990 | Hyatt | |
| 5,129,088 A | * | 7/1992 | Auslander et al. | ............. 711/1 |
| 5,276,840 A | | 1/1994 | Yu | |
| 5,459,846 A | | 10/1995 | Hyatt | |
| 5,526,506 A | | 6/1996 | Hyatt | |
| 5,537,573 A | | 7/1996 | Ware et al. | |
| 5,600,817 A | | 2/1997 | Macon, Jr. et al. | |
| 5,602,999 A | | 2/1997 | Hyatt | |
| 5,606,681 A | | 2/1997 | Smith et al. | |
| 5,668,968 A | * | 9/1997 | Wu | ............................... 711/3 |
| 5,754,888 A | | 5/1998 | Yang et al. | |
| 5,781,797 A | | 7/1998 | Crick et al. | |
| 5,787,472 A | | 7/1998 | Dan et al. | |
| 5,829,023 A | | 10/1998 | Bishop | |
| 5,890,212 A | | 3/1999 | Sokolov et al. | |
| 5,923,898 A | | 7/1999 | Genduso et al. | |
| 5,924,116 A | | 7/1999 | Aggarwal et al. | |
| 6,249,864 B1 | * | 6/2001 | Ito | ............................... 713/2 |

* cited by examiner

*Primary Examiner*—Matthew Kim
*Assistant Examiner*—Matthew D. Anderson
(74) *Attorney, Agent, or Firm*—David K. Lucente; Derek J. Berger

(57) ABSTRACT

According to one embodiment of the present invention a disc controller in a disc drive includes a cache memory and a control circuit. The control circuit is configured to identify an operating system of a host computer coupled to the disc drive, select a segmentation level for the cache memory based on the identified operating system, and store information in the cache memory according to the segmentation level. According to another embodiment of the present invention a cache memory in a disc drive is operated by identifying an operating system of a host computer coupled to the disc drive, selecting a segmentation level for the cache memory based on the identified operating system, and storing information in the cache memory according to the segmentation level. The operating system is identified by reading a partition type from a master boot record stored in a disc in the disc drive.

17 Claims, 6 Drawing Sheets

ADAPTABLE CACHE FOR DISC DRIVE

RELATED APPLICATION

This application claims the benefit of U.S. Provisional Application Ser. No. 60/151,203 filed Aug. 27, 1999 under 35 USC 119(e).

FIELD OF THE INVENTION

The present invention relates to the field of disc drive data storage devices. More particularly, this invention relates to an adaptable cache for a disc drive.

BACKGROUND OF THE INVENTION

An important device in any computer system is a data storage device. Computer systems have many different places where information, such as data and instructions, can be stored. One place for storing massive amounts of information is a disc drive. The disc drive has one or more discs, each with two surfaces on which data is stored. The surfaces are coated with a magnetizable medium that is magnetized in alternate directions to store the information. The coated surfaces are computer-readable media holding computer-readable data and computer-readable and computer-executable instructions. The discs are mounted on a hub of a spindle motor for rotation at an approximately constant high speed during the operation of the disc drive. An actuator assembly in the disc drive moves magnetic transducers, also called read/write heads or heads, to various locations relative to the discs while the discs are rotating, and electrical circuitry is used to write information to and read information from the media through the heads. Information is stored in the media of one or both of the surfaces of each disc. The disc drive also includes circuitry for encoding information written to the media and for decoding information read from the media. A microprocessor controls most operations of the disc drive, such as transmitting information read from the media back to a host computer and receiving information from the host computer for writing to the media.

In some disc drives, information is stored in a multiplicity of concentric circular tracks in the media on each disc. In other disc drives, information is stored in a single track that forms a continuous spiral in the media on each disc. The tracks are subdivided into sectors or blocks of media in which the information is stored. A read/write head is positioned over a track to write information to or read information from the track. Servo information is read from the track by the head, and a feedback control system determines a position error signal from the servo information. If the head is not in a correct position, it is moved to a desired position over the track in response to the position error signal. Once the operation is complete, the head may be controlled to move to a new, target track, to write information to or read information from the target track.

Cache memories are used to improve the performance of disc drives. A cache memory is typically located within a disc controller which controls the operation of the disc drive. The disc controller is coupled to a host computer through a bus. The disc controller passes information back and forth between the discs and the host computer in response to commands generated by the host computer. The commands cause the disc controller to initiate read and write operations. Each command includes a starting address, a block length of a number of blocks of information to be retrieved from the discs, and a command type, such as a read or a write. For example, after the disc controller receives a read command, it retrieves the required number of blocks of information from the discs beginning at the starting address.

After the information has been retrieved, the disc drive controller passes the information back to the host computer. The cache memory improves the performance of the disc drive by reducing the number of times the disc controller must go to the discs to retrieve information. The cache memory stores the most recently accessed information in a random access memory (RAM). When the host computer runs a particular software application, input/output patterns in the information seen by the disc controller tend to repeat. Therefore, there is a good chance that information obtained from the discs will be retrieved again. When the host computer requests the retrieval of information that is in the cache memory, the disc controller does not have to retrieve the information from the discs, but can retrieve it directly from the cache memory. The cache memory has a much faster access time than the discs, so retrieving the information directly from the cache memory substantially reduces the access time seen by the host computer.

The cache memory includes a cache buffer to store bytes of information and a cache table. The cache table maintains a list of the information present in the cache buffer by recording the starting addresses of the information retrieved from the discs. When the disc controller receives a write instruction that corresponds to addresses present in the cache memory, it updates the cache table such that it no longer indicates the information is present within the buffer. This prevents old information from being read from the cache buffer.

When the disc controller receives a read command, it refers to the cache table to determine whether the requested information is present in the cache buffer. If the information is not present in the cache buffer the event is called a cache miss, and the disc controller retrieves the information from the discs and relays it to the host computer. The disc controller also loads the information into the cache buffer and updates the cache table. A cache hit occurs when the information requested by the host computer is present in the cache buffer. In this situation, the disc controller retrieves the information directly from the cache buffer and transmits it to the host computer. The ratio of cache hits to cache misses is a measure of cache memory performance. The higher the ratio of cache hits to cache misses is, the better the cache memory is performing.

In a multi-segment cache memory, the cache buffer is divided into segments. The number of segments in the cache buffer is known as the segmentation level. By segmenting the cache buffer, the disc controller can perform look ahead operations by retrieving excess blocks of information to fill an entire segment. Because memory operations tend to form repetitive and often predictable patterns, the host computer may next request information from consecutive blocks. The segmentation level determines the number of blocks of information stored in each segment, and therefore determines the number of excess blocks retrieved. The greater the segmentation level, the smaller the number of blocks stored in each segment. Performance of the cache memory may be improved by adjusting the segmentation level.

A segmentation level that provides the best available performance depends upon the host computer. Different host computers run on different operating systems, and will retrieve information from the discs in different patterns. A segmentation level that performs well for one operating system may perform poorly for another operating system. In conventional disc drives the segmentation level for a cache memory is selected based on laboratory experiments before the disc drive is sold. However, often the operating system that the disc drive is to work with is unknown, and the segmentation level selected in the laboratory may not result in the best possible performance of the cache memory. There remains a need for methods of operating a disc drive, and in particular methods of selecting a segmentation level for a cache memory in the disc drive, that result in the best possible performance of the cache memory with any operating system that it might work with.

SUMMARY OF THE INVENTION

According to one embodiment of the present invention a disc controller in a disc drive includes a cache memory and a control circuit. The control circuit is configured to identify an operating system of a host computer coupled to the disc drive, select a segmentation level for the cache memory based on the identified operating system, and store information in the cache memory according to the segmentation level. According to another embodiment of the present invention a cache memory in a disc drive is operated by identifying an operating system of a host computer coupled to the disc drive, selecting a segmentation level for the cache memory based on the identified operating system, and storing information in the cache memory according to the segmentation level. The operating system is identified by reading a partition type from a master boot record stored in a disc in the disc drive.

Advantageously, the embodiments of the present invention provide for a selection of a segmentation level for the cache memory that is particularly suited for the operating system of the host computer. This results in better ratios of cache hits to cache misses as information is retrieved from the disc drive, and reduces the number of times that information must be read from discs in the disc drive. The selection of the segmentation level best suited to the operating system thereby improves the performance of the disc drive over disc drives that do not adapt the segmentation level to the operating system of the host computer.

DESCRIPTION OF THE PREFERRED EMBODIMENT

Figure 1:
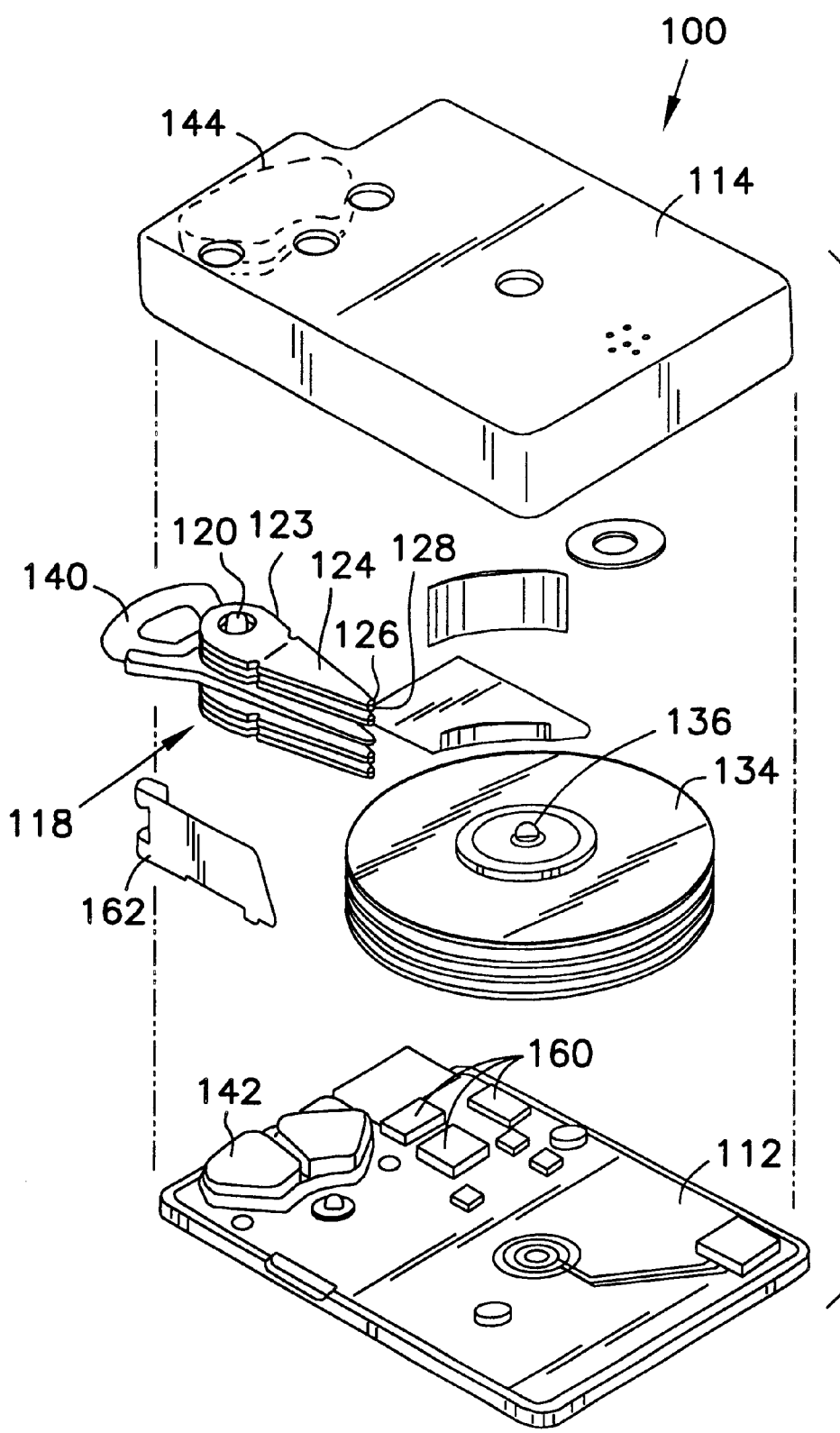
FIG. 1 is an exploded view of a disc drive according to an embodiment of the present invention.

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the claims. Similar elements in the Figures have been given the same reference numerals for purposes of clarity.

In this description each bus includes one or more of address lines, data lines, and control lines to exchange address signals, data signals, and control signals, respectively, between two devices.

The embodiments of the present invention described in this application are useful with all types of disc drives, including hard disc drives, zip drives, and floppy disc drives. An exploded view of a disc drive 100 is shown in FIG. 1 according to an embodiment of the present invention. The disc drive 100 includes a housing or base 112 and a cover 114. The base 112 and cover 114 form a disc enclosure. An actuator assembly 118 is rotatably mounted to an actuator shaft 120, and the actuator shaft 120 is mounted to the base 112. The actuator assembly 118 includes a comb-like structure of a plurality of arms 123. A load spring 124 is attached to each arm 123. The load springs 124 are also referred to as suspensions, flexures, or load beams. A slider 126 is attached to an end of each load spring 124, and each slider 126 carries a read/write head 128. Each slider 126 is a small ceramic block which is passed over one of several discs 134.

The discs 134 each have two surfaces, and information is stored on one or both of the surfaces. The surfaces are coated with a magnetizable medium that is magnetized in alternate directions to store the information. The surfaces are computer-readable media holding the information including computer-readable data and computer-readable and computer-executable instructions. The information is arranged in tracks in the media of the discs 134. The discs 134 are mounted on a hub 136 of a spindle motor (not shown) for rotation at an approximately constant high speed. Each slider 126 is moved over the media of one of the discs 134 by the actuator assembly 118 as the discs 134 rotate so that the read/write head 128 may read information from or write information to the surface of the disc 134. The embodiments of the present invention described herein are equally applicable to disc drives which have a plurality of discs or a single disc attached to a spindle motor, and to disc drives with spindle motors which are either under a hub or within the hub. The embodiments of the present invention are equally applicable to disc drives in which information is stored in a multiplicity of concentric circular tracks in the media of each disc, or in disc drives in which information is stored in a single track arranged as a continuous spiral in the media of each disc.

Each slider 126 is held over the media of one of the discs 134 by opposing forces from the load spring 124 forcing the slider 126 toward the media and air pressure on an air bearing surface of the slider 126 caused by the rotation of the discs 134 lifting the slider 126 away from the media. It should also be noted that the embodiments of the present invention described herein are equally applicable to sliders 126 having more than one read/write head 128. For example, magneto-resistive heads, also called MR heads, have one head used for reading information from media and a second head for writing information to the media. MR heads may have an additional heads used for other purposes such as erasing the media.

A voice coil 140 is mounted to the actuator assembly 118 opposite the load springs 124 and the sliders 126. The voice coil 140 is immersed in a magnetic field of a first permanent magnet 142 attached within the base 112, and a second permanent magnet 144 attached to the cover 114. The permanent magnets 142, 144, and the voice coil 140 are components of a voice coil motor which is controlled to apply a torque to the actuator assembly 118 to rotate it about the actuator shaft 120. Current is applied to the voice coil 140 in a first direction to generate an electromagnetic field that interacts with the magnetic field of the permanent magnets 142, 144. The interaction of the magnetic fields applies a torque to the voice coil 140 to rotate the actuator assembly 118 about the actuator shaft 120, and the actuator assembly 118 is accelerated to move the read/write head 128 to a new position. A current applied to the voice coil 140 in a direction opposite to the first direction results in an opposite torque on the actuator assembly 118. The opposite torque may be used to decelerate the actuator assembly 118 and position the read/write head 128 over a target track on one of the discs 134. The opposite torque may also be used to accelerate the actuator assembly 118 to a different position.

The disc drive 100 includes one or more integrated circuits 160 coupled to the actuator assembly 118 through a flexible cable 162. The integrated circuits 160 may be coupled to control current in the voice coil 140 and resulting movements of the actuator assembly 118. The integrated circuits 160 include a disc controller coupled to the read/write head 128 in the slider 126 for providing a signal to the read/write head 128 when information is being written to the media on the discs 134 and for receiving and processing a read/write signal generated by the read/write head 128 when information is being read from the media on the discs 134. A feedback control system in the integrated circuits 160 receives servo information read from the media through the read/write heads 128. The feedback control system determines a position error signal from the servo information. If the read/write heads 128 are not in a correct position, they are moved to a desired position over a target track in response to the position error signal.

Figure 2:
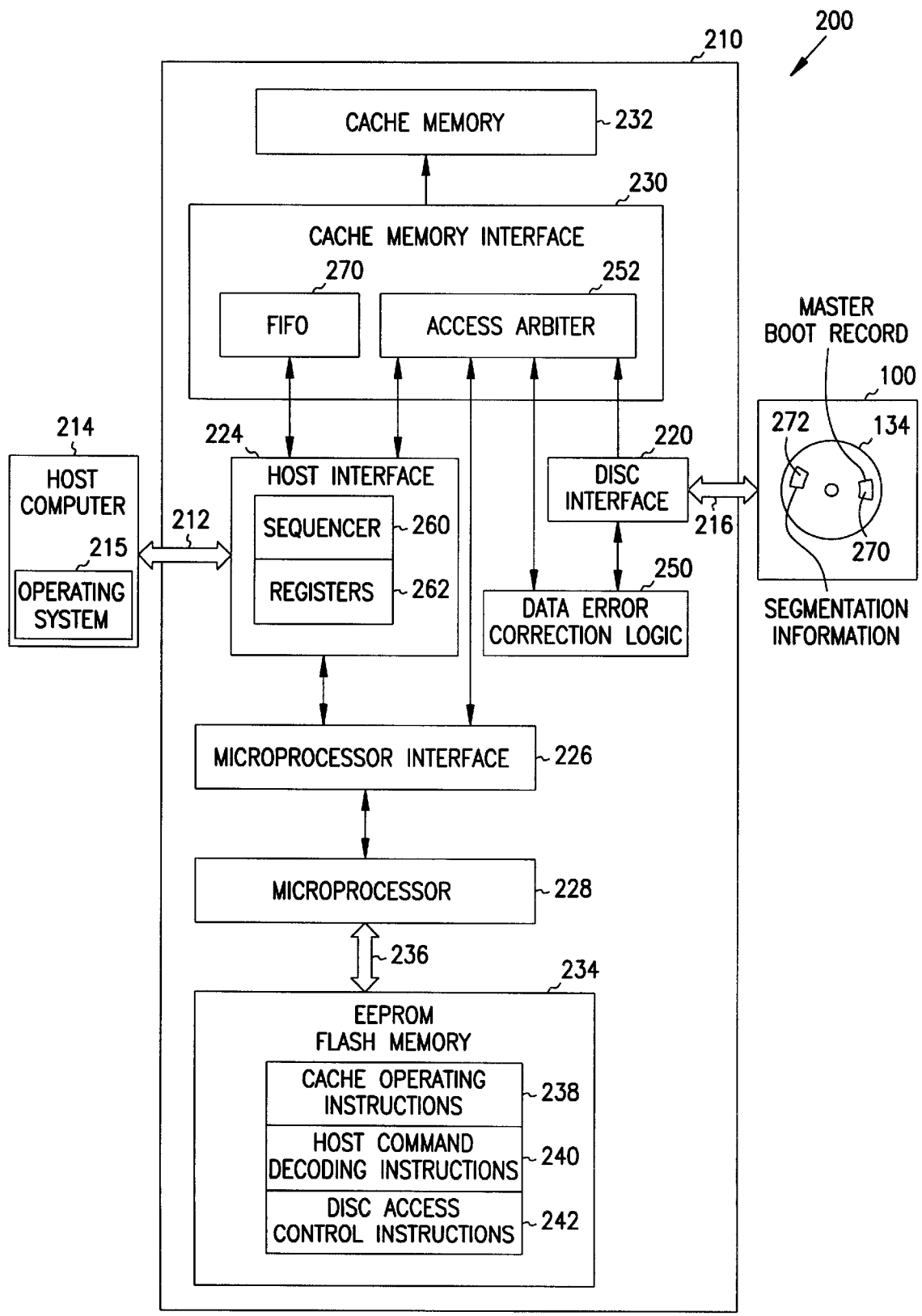
FIG. 2 is a block diagram of an information handling system according to an embodiment of the present invention.

A block diagram of an information handling system 200 is shown in FIG. 2 according to an embodiment of the present invention. The system 200 includes a disc controller 210 coupled to exchange information through a bus 212 with a host computer 214 and through a bus 216 with the other parts of the disc drive 100 shown in FIG. 1. The integrated circuits 160 include the disc controller 210. The host computer 214 has an operating system 215 that governs its operation. For example, the operating system 215 determines how information is accessed from the disc drive 100. The operating system 215 is one of several types of available operating systems that may be used by the host computer 214, and each will access information from the disc drive 100 in a different manner. The bus 212 may be a small computer systems interface (SCSI). The host computer 214 is a device that provides a service to an end user, and may be a personal computer, a server, a workstation, a routing switch, a multi-processor computer system, or other device. The host computer 214 may also be an information appliance such as, for example, a television, a cellular telephone or any wireless device, a pager, or a daily planner or organizer, or an information component such as, for example, a telecommunications modem, or other appliance such as, for example, a washing machine or a microwave oven.

The disc controller 210 includes a number of internal interfaces including a disc interface 220 coupled through the bus 216 to the other parts of the disc drive 100. The disc controller 210 also has a host interface 224 coupled through the bus 212 to the host computer 214. A microprocessor interface 226 is coupled to control an exchange of information between the host interface 224 and a microprocessor 228. A cache memory interface 230 is coupled to exchange information between the disc interface 220, the host interface 224, the microprocessor interface 226, and a cache memory 232. The cache memory 232 is a volatile random access memory device such as a dynamic random access memory device (DRAM).

The microprocessor 228 is coupled to exchange information with an electrically erasable and programmable read only memory (EEPROM) such as a flash memory device 234 through a bus 236. The flash memory device 234 is a computer-readable medium that stores computer-readable and computer-executable instructions. The microprocessor 228 executes instructions stored in the flash memory device 234 to control the transfer of information between the discs 134 and the host computer 214 in response to commands received from the host computer 214. The flash memory device 234 stores cache operating instructions 238 that are retrieved and executed by the microprocessor 228 to manage information storage and retrieval from the cache memory 232. The flash memory device 234 also contains host command decoding instructions 240 to allow the microprocessor 228 to decode commands from the host computer 214 and disc access control instructions 242 to allow the microprocessor 228 to access information on the discs 134.

The disc controller 210 also includes a data error correction logic circuit 250 coupled between the disc interface 220 and the cache memory interface 230. The cache memory interface 230 communicates with the other elements of the disc controller 210 through an access arbiter 252. The host interface 224 includes a sequencer 260 to control the transfer of information between the cache memory 232 and the host computer 214. The host interface 224 also includes several registers 262.

During a read operation, the host computer 214 generates a read command to read selected information which is received by the microprocessor 228 through the host interface 224 and the microprocessor interface 226. The read command is decoded by the microprocessor 228 according to the decoding instructions 240, and includes a starting address and the number of blocks of the selected information. In response to each read command, the microprocessor 228 first refers to a cache table in the cache memory 232 that contains a list of the information present in the cache memory 232. If the selected information is present, a cache hit has occurred and the microprocessor 228 retrieves the selected information from the cache memory 232 and transmits it to the host computer 214 through the host interface 224 and the bus 212.

If the selected information is not in the cache memory 232, a cache miss has occurred and the microprocessor 228 reads the requested number of blocks of the selected information from the discs 134 through the bus 216 and the disc interface 220. The read begins at the starting address and includes the number of blocks specified in the read command and enough additional blocks to fill a segment in the cache memory 232. A segmentation level of the cache memory 232 determines the number of blocks that can be stored in each segment of the cache memory 232, and a selection of the segmentation level will be described in more detail hereinbelow. The retrieval of additional blocks of information from the discs 134 to fill a segment is a look ahead operation. The information read from the discs 134 is written to fill the segment in the cache memory 232, the cache table is updated to identify the newly added information, and the selected information is transmitted to the host computer 214 through the host interface 224 and the bus 212.

The segmentation level is selected based on information in a master boot record 270 that is written to and stored on one of the discs 134 of the disc drive 100. The master boot record 270 contains a boot record and a table of partition information for the discs 134. The master boot record 270 is created by the host computer 214 and is written to the discs 134 at the instruction of the host computer 214. The partition information indicates how the discs 134 will be partitioned to store information. The partition information includes a partition type that identifies the operating system 215 of the host computer 214.

The partition type in the master boot record 270 is used by the disc controller 210 to select the segmentation level for the cache memory 232 from segmentation information 272 stored on one of the discs 134 according to an embodiment of the present invention. The segmentation information includes a list of segmentation levels that can be selected for the cache memory 232, and a corresponding list of partition types identifying the operating systems that the host computer 214 may be operating under. Each partition type is linked to the segmentation level in the list that will result in the highest ratio of cache hits to cache misses for the cache memory 232. The segmentation information 272 is stored in a reserve cylinder or another reserved area of the discs 134 that is not accessible by the host computer 214. The segmentation information 272 is therefore not disturbed during the normal operating life of the disc drive 100. Those skilled in the art with the benefit of the present description will understand that the disc drive 100 may include elements to allow the segmentation information to be altered under appropriate circumstances. The operation of the disc controller 210 in selecting the segmentation level will be more fully described hereinbelow.

Figure 3:
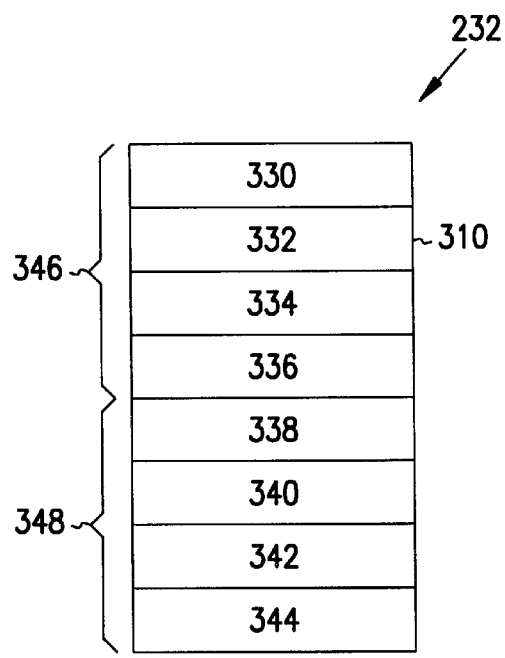
FIG. 3 is a block diagram of a cache memory according to an embodiment of the present invention.
Figure 3:
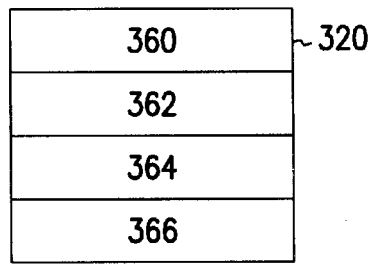

The cache memory 232 is shown in a block diagram in FIG. 3 according to an embodiment of the present invention. The cache memory 232 is divided into two parts, a cache buffer 310 and a cache table 320. The cache buffer 310 is divided into a number of sectors 330, 332, 334, 336, 338, 340, 342, and 344 of memory cells, each of which store a number of bytes of information from the discs 134. The cache buffer 310 has a segmentation level of 2 and is divided into two segments 346 and 348. The segment 346 includes the sectors 330–336 and the segment 348 includes the sectors 338–344. The cache table 320 has several sectors 360, 362, 364, and 366 of memory cells. The sectors 360 and 362 in the cache table 320 each contain a starting address and a number of blocks of information stored in one of the segments 346, 348. The microprocessor 228 can determine whether a particular block of information is present in the cache buffer 310 by reading the starting address and the number of blocks in each segment 346, 348 from the cache table 320.

Figure 4:
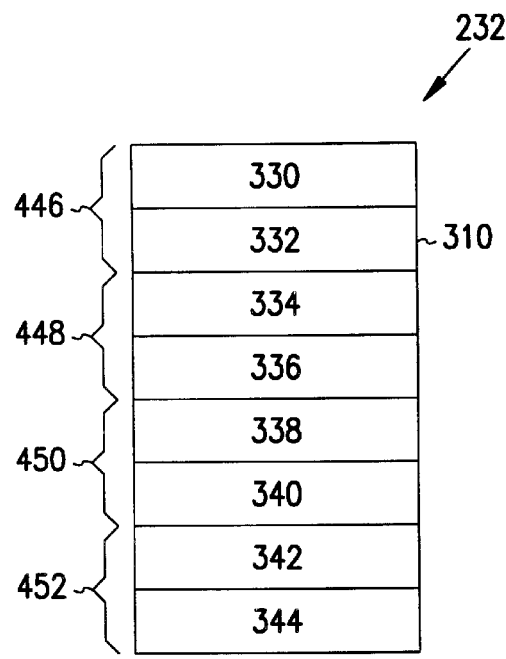
FIG. 4 is a block diagram of a cache memory according to an embodiment of the present invention.
Figure 4:
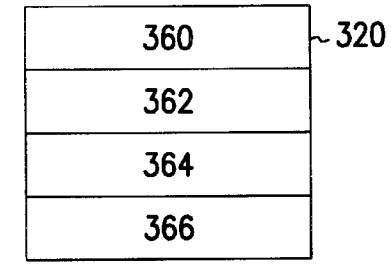

The cache memory 232 is shown again in FIG. 4, this time with a segmentation level of 4 according to another embodiment of the present invention. The cache buffer 310 is divided into four segments: segment 446 including the sectors 330, 332, segment 448 including the sectors 334, 336, segment 450 including the sectors 338, 340, and segment 452 including the sectors 342, 344. A starting address and the number of blocks stored in each segment 446, 448, 450, and 452 are stored in the cache table 320. The segmentation level 4 illustrated in FIG. 4 results in more segments in the cache memory 232 and fewer blocks of information in each segment. The segmentation level 2 illustrated in FIG. 3 has fewer segments in the cache memory 232 and more blocks of information in each segment. The segmentation level will strongly influence the performance of the cache memory 232, and different operating systems will use the cache memory 232 most efficiently at different segmentation levels. One skilled in the art having the benefit of the present description will understand that the cache memory 232 may have more or less sectors, and more or less segments, according to alternate embodiments of the present invention.

Figure 5:
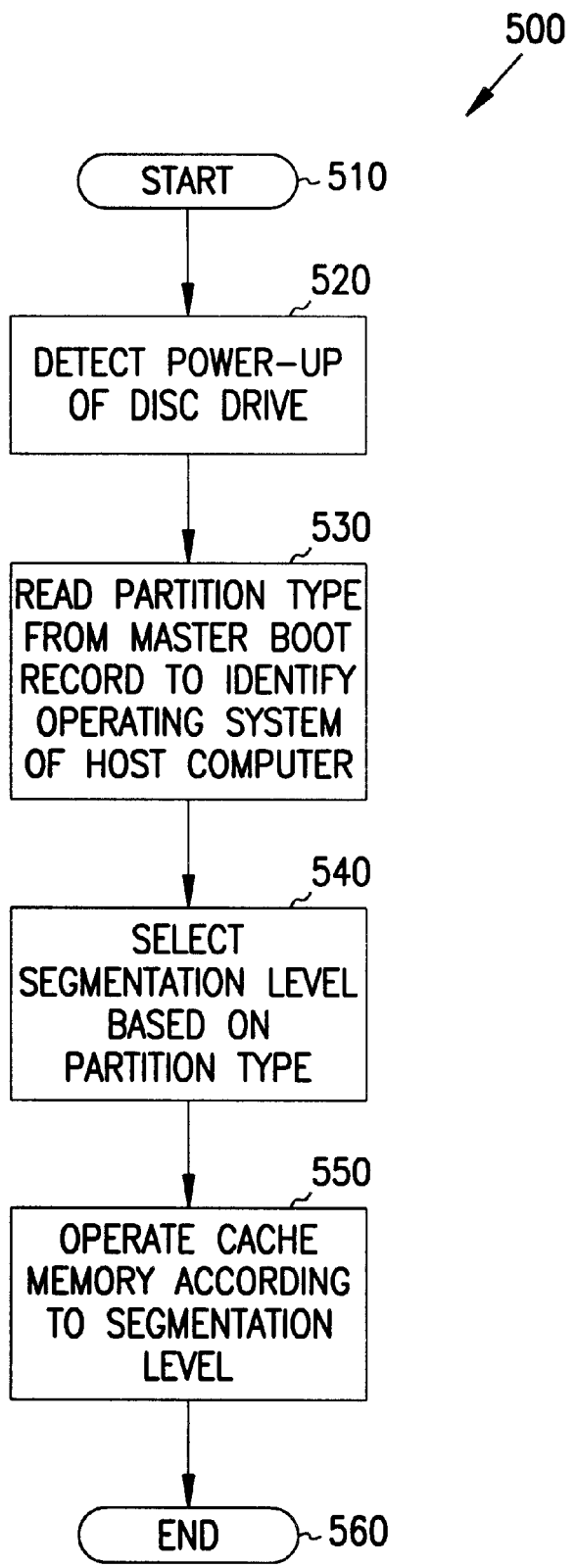
FIG. 5 is a flowchart of a method for operating a cache memory according to an embodiment of the present invention.

A flowchart of a method 500 for operating the cache memory 232 is shown in FIG. 5 according to an embodiment of the present invention. The method 500 is stored as a set of computer-executable instructions in the flash memory device 234 and is executed by the microprocessor 228. The method begins in 510 and in 520 detects a power-up when the disc drive 100 first receives power to begin operation. The partition type in the master boot record 270 is read in 530 to identify the operating system 215 of the host computer 214, and a segmentation level is selected in 540 based on the partition type. The segmentation level is selected from the segmentation information 272 stored on the discs 134. The master boot record 270 was written to the discs 134 prior to the power-up detected in 520. The cache memory 232 is then operated in 550 based on the segmentation level selected in 540, and the method 500 ends in 560.

Figure 6:
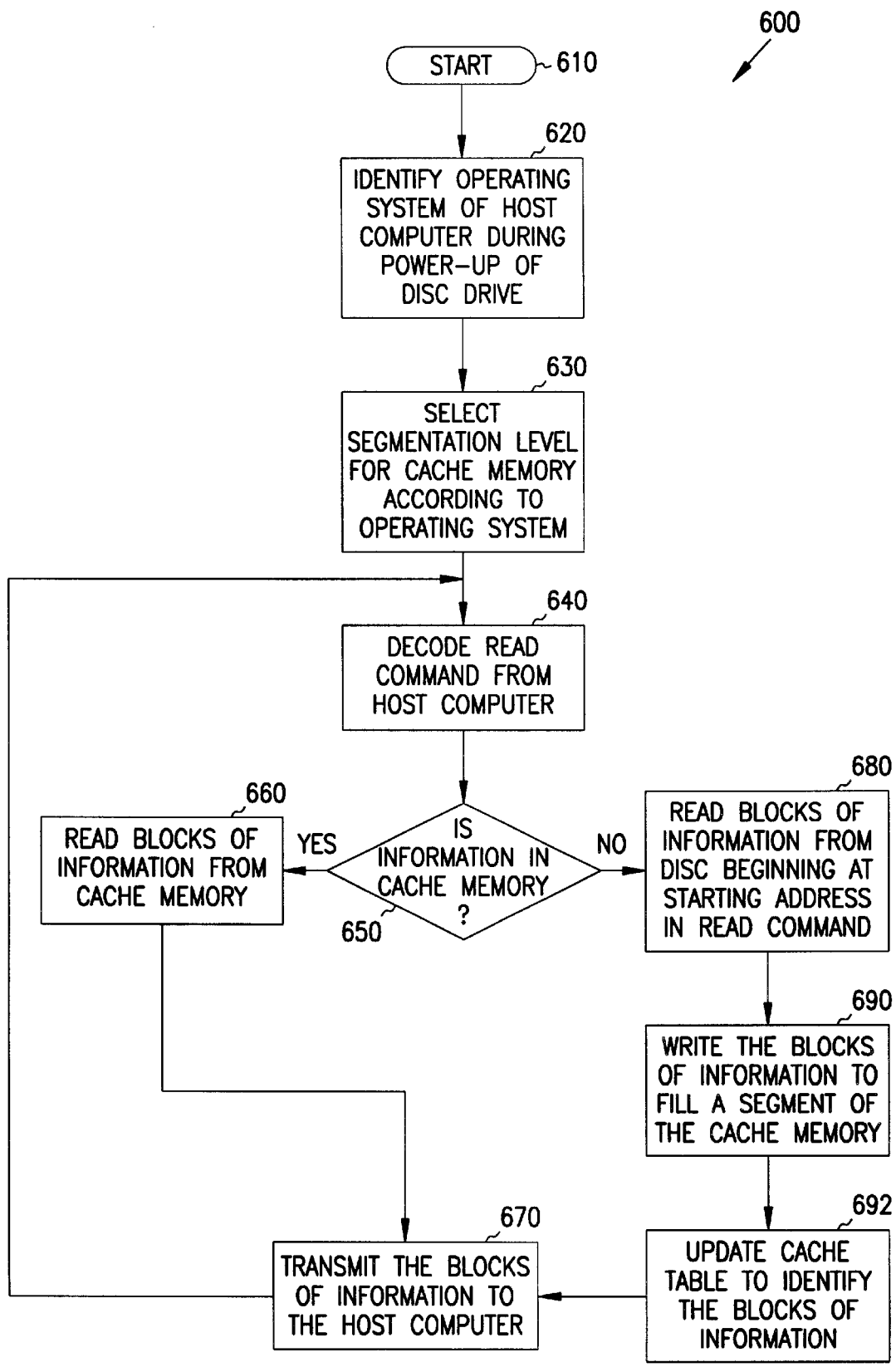
FIG. 6 is a flowchart of a method for operating an information handling system according to an embodiment of the present invention.

A flowchart of a method 600 for operating the information handling system 200 during a read command from the host computer 214 is shown in FIG. 6 according to another embodiment of the present invention. The method 600 is stored as a set of computer-executable instructions in the flash memory device 234 and is executed by the microprocessor 228. The method begins in 610 and in 620 the operating system 215 of the host computer 214 is identified during a power-up of the disc drive 100. A segmentation level for the cache memory 232 is selected in 630 according to the operating system 215 identified in 620, and a read command transmitted by the host computer 214 is decoded in 640. The read command contains a starting address and a number of blocks of information to be read. The microprocessor 228 refers to a cache table in the cache memory 232 in 650 to determine if the blocks of information is stored there. If a cache hit occurs, the blocks of information are read from the cache memory 232 in 660 and transmitted to the host computer 214 in 670. If a cache miss occurs, the blocks of information are read from the discs 134 in the disc drive 100 in 680 beginning at the starting address. An excess number of blocks of information are read in 680, and the blocks of information are written to fill a segment of the cache memory 232 in 690. The cache table is updated in 692 to identify the blocks of information added to the cache memory 232, and the blocks of information requested in the read command are transmitted to the host computer in 670. The method 600 then returns to 640 to decode another read command.

The information handling system 200, and the methods 500 and 600, select a segmentation level for the cache memory 232 that is particularly suited for the operating system 215 of the host computer 214. The segmentation level is selected based on the identity of the operating system 215, which is identified beforehand. This results in better ratios of cache hits to cache misses as information is retrieved from the disc drive 100, and reduces the number of times that information must be read from the discs 134. The selection of the segmentation level best suited to the operating system 215 thereby improves the performance of the disc drive 100 over disc drives that do not adapt the segmentation level to the operating system 215 of the host computer 214.

Figure 7:
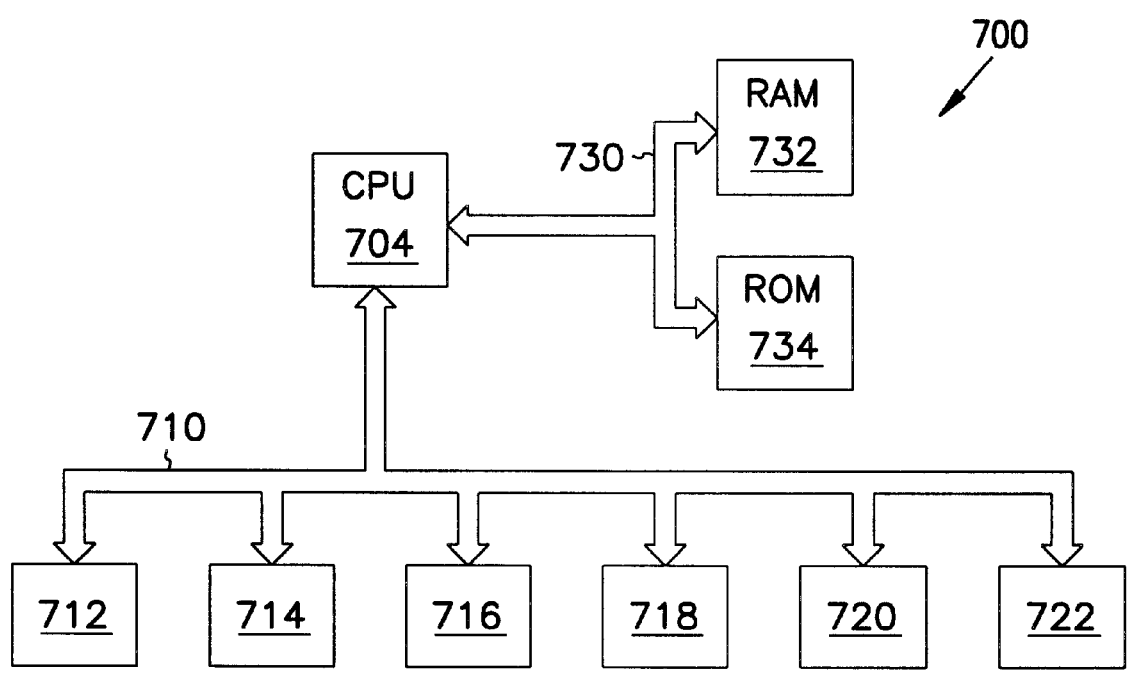
FIG. 7 is a block diagram of an information handling system according to an embodiment of the present invention.

A block diagram of an information handling system 700 is shown in FIG. 7 according to an embodiment of the present invention. The information handling system 700 may also be called an electronic system or a computer system. The information handling system 700 includes a central processing unit (CPU) 704 coupled to exchange information through a bus 710 with several peripheral devices 712, 714, 716, 718, 720, and 722. The peripheral devices 712–722 include the disc drive 100 according to embodiments of the present invention, including the information handling system 200 and one or both of the methods 500 and 600, and may also include a magneto optical drive, a floppy disc drive, a monitor, a keyboard, and other such peripherals. The CPU 704 is also coupled to exchange information through a bus 730 with a random access memory (RAM) 732 and a read-only memory (ROM) 734.

Those skilled in the art having the benefit of this description can appreciate that the present invention may be practiced with any variety of system. Such systems may include, for example, a video game, a hand-held calculator, a personal computer, a server, a workstation, a routing switch, or a multi-processor computer system, or an information appliance such as, for example, a television, a cellular telephone or any wireless device, a pager, or a daily planner or organizer, or an information component such as, for example, a telecommunications modem, or other appliance such as, for example, a hearing aid, washing machine or microwave oven.

CONCLUSION

In conclusion, a disc controller 210 is disclosed. The disc controller 210 includes a cache memory 232 and a control circuit 228, 234. The control circuit 228, 234 is configured to identify an operating system 215 of a host computer 214 coupled to the disc controller 210, select a segmentation level for the cache memory 232 based on the identified operating system 215, and store information in the cache memory 232 according to the segmentation level. The control circuit 228, 234 is configured to read a partition type from a master boot record 270 stored in a disc 134 in a disc drive 100 coupled to the disc controller 210 to identify the operating system 215 of the host computer 214. The control circuit 228, 234 is further configured to read segmentation information from the disc 134 and select a segmentation level listed in the segmentation information that corresponds to the identified operating system 215. The control circuit 228, 234 is also configured to read requested blocks of information from one or more discs 134 in the disc drive 100, and write the requested blocks of information to a segment 346, 348, 446, 448, 450, 452 of the cache memory 232. The control circuit 228, 234 is further configured to decode a read command from the host computer 214 including a starting address and a number of requested blocks of information to be read, read a cache table 320 in the cache memory 232 to determine if the requested blocks of information are stored in the cache memory 232, and if the requested blocks of information are stored in the cache memory 232, then read the requested blocks of information from the cache memory 232 and transfer the requested blocks of information to the host computer 214. If the requested blocks of information are not stored in the cache memory 232, then the control circuit 228, 234 is further configured to read the requested blocks of information from a plurality of discs 134 in the disc drive 100, read excess blocks of information from the discs 134, write the requested and excess blocks of information to the cache memory 232 to fill a segment 346, 348, 446, 448, 450, 452 of the cache memory 232, update the cache table 320 to identify the requested and excess blocks of information written to the cache memory 232, and transfer the requested blocks of information to the host computer 214. The control circuit 228, 234 includes a microprocessor 228 and a first memory device 234 coupled to the microprocessor 228. The first memory device 234 includes computer-readable and computer-executable instructions 238, 240, 242 to cause the microprocessor 228 to control operations of the disc controller 210. The cache memory 232 is a second memory device 232, and the disc controller 210 further includes a disc interface 220 coupled between a plurality of discs 134 in the disc drive 100, the cache memory 232, and the microprocessor 228, and a host interface 224 coupled between the host computer 214, the cache memory 232, and the microprocessor 228. A disc drive 100 of a type including the disc controller 210 further includes a disc 134 coupled to the disc controller 210 to store information to be read by the disc controller 210. The disc drive 100 of claim 8, further includes a base 112 a plurality of discs 134 rotatably attached to the base 112, a spindle motor attached to the base and coupled to rotate the discs 134, an actuator 118 attached to the base 112, one end of the actuator 118 having a read/write head 128 and another end of the actuator 118 having a voice coil 140 which forms a portion of a voice coil motor 140, 142, 144, and a number of integrated circuits 160 including the disc controller 210 and coupled to the voice coil motor and the read/write head 128 to control the disc drive 100. An information handling system 200 includes the disc drive 100 and further includes the host computer 214 coupled to the disc drive 100 to exchange information with the disc drive 100.

A method for operating a cache memory 232 in a disc drive 100 is also disclosed. The method includes identifying an operating system 215 of a host computer 214 coupled to the disc drive 100, selecting a segmentation level for the cache memory 232 based on the identified operating system 215, and storing information in the cache memory 232 according to the segmentation level. Identifying the operating system 215 may further include reading a partition type from a master boot record 270 stored in a disc 134 in the disc drive 100 to identify the operating system 215 of the host computer 214. Selecting a segmentation level may include reading segmentation information from a disc 134 in the disc drive 100, and selecting a segmentation level listed in the segmentation information that corresponds to the identified operating system 215. Storing information may include reading requested blocks of information from one or more discs 134 in the disc drive 100, and writing the requested blocks of information to a segment 346, 348, 446, 448, 450, 452 of the cache memory 232. The method may further include decoding a read command from the host computer 214 including a starting address and a number of requested blocks of information to be read, reading a cache table 320 in the cache memory 232 to determine if the requested blocks of information are stored in the cache memory 232, and, if the requested blocks of information are stored in the cache memory 232, then reading the requested blocks of information from the cache memory 232 and transferring the requested blocks of information to the host computer 214. If the requested blocks of information are not stored in the cache memory 232, then the method may further include reading the requested blocks of information from a plurality of discs 134 in the disc drive 100, reading excess blocks of information from the discs 134, writing the requested and excess blocks of information to the cache memory 232 to fill a segment 346, 348, 446, 448, 450, 452 of the cache memory 232, updating the cache table 320 to identify the requested and excess blocks of information written to the cache memory 232, and transferring the requested blocks of information to the host computer 214.

A disc controller 210 is also disclosed including a cache memory 232, a control circuit 228, 234 to control operations of the disc controller 210 and the cache memory 232, and means for selecting a segmentation level for the cache memory 232.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc controller comprising:
   a cache memory; and
   a control circuit configured to:
      (a) identify an operating system of a host computer coupled to the disc controller;
      (b) select a segmentation level for the cache memory based on the identified operating system; and
      (c) store information in the cache memory according to the segmentation level.

2. The disc controller of claim 1 wherein the identify step (a) further comprises step of reading a partition type from a master boot record stored in a disc in a disc drive coupled to the disc controller to identify the operating system of the host computer.

3. The disc controller of claim 1 wherein the select step (b) comprises steps of:
   (b)(i) reading segmentation information from a disc in a disc drive coupled to the disc controller; and
   (b)(ii) selecting a segmentation level listed in the segmentation information that corresponds to the identified operating system.

4. The disc controller of claim 1 wherein the store step (c) comprises steps of:
   (c)(i) reading requested blocks of information from one or more discs in a disc drive coupled to the disc controller; and
   (c)(ii) writing the requested blocks of information to a segment of the cache memory.

5. The disc controller of claim 1 wherein the control circuit is further configured to:
   (d) decode a read command from the host computer comprising a starting address and a number of requested blocks of information to be read;
   (e) read a cache table in the cache memory to determine if the requested blocks of information are stored in the cache memory; and
   (f) if the requested blocks of information are stored in the cache memory, then read the requested blocks of information from the cache memory and transfer the requested blocks of information to the host computer.

6. The disc controller of claim 5 wherein, if the requested blocks of information are not stored in the cache memory, then the control circuit is further configured to:
   (g) read the requested blocks of information from a plurality of discs in the disc drive;
   (h) read excess blocks of information from the discs;
   (i) write the requested and excess blocks of information to the cache memory to fill a segment of the cache memory;
   (j) update the cache table to identify the requested and excess blocks of information written to the cache memory; and
   (k) transfer the requested blocks of information to the host computer.

7. The disc controller of claim 1 wherein:
   the control circuit comprises:
      a microprocessor; and
      a first memory device coupled to the microprocessor and comprising computer-readable and computer-executable instructions to cause the microprocessor to control operations of the disc controller;
   the cache memory comprises a second memory device; and
   the disc controller further comprises:
      a disc interface coupled between a plurality of discs in a disc drive, the cache memory, and the microprocessor; and
      a host interface coupled between a host computer, the cache memory, and the microprocessor.

8. A disc drive of a type comprising the disc controller of claim 1 and further comprising a disc coupled to the disc controller to store information to be read by the disc controller.

9. The disc drive of claim 8, further comprising:
   a base;
   a plurality of discs rotatably attached to the base;
   a spindle motor attached to the base and coupled to rotate the discs;
   an actuator attached to the base, one end of the actuator having a read/write head and another end of the actuator having a voice coil which forms a portion of a voice coil motor; and
   a plurality of integrated circuits including the disc controller and coupled to the voice coil motor and the read/write head to control the disc drive.

10. An information handling system of a type including the disc drive of claim 8 and further comprising a host computer coupled to the disc drive to exchange information with the disc drive.

11. A method for operating a cache memory in a disc drive comprising steps of:
   (a) identifying an operating system of a host computer coupled to the disc drive;
   (b) selecting a segmentation level for the cache memory based on the identified operating system; and
   (c) storing information in the cache memory according to the segmentation level.

12. The method of claim 11 wherein the identifying step (a) further comprises step of reading a partition type from a master boot record stored in a disc in the disc drive to identify the operating system of the host computer.

13. The method of claim 11 wherein the selecting step (b) comprises steps of:
   (b)(i) reading segmentation information from a disc in the disc drive; and
   (b)(ii) selecting a segmentation level listed in the segmentation information that corresponds to the identified operating system.

14. The method of claim 11 wherein the storing step (c) comprises steps of:
   (c)(i) reading requested blocks of information from one or more discs in the disc drive; and (c)(ii) writing the requested blocks of information to a segment of the cache memory.

15. A method of operating a disc drive of a type including the steps of claim 11 and further comprising:

(d) decoding a read command from the host computer comprising a starting address and a number of requested blocks of information to be read;

(e) reading a cache table in the cache memory to determine if the requested blocks of information are stored in the cache memory; and (f) if the requested blocks of information are stored in the cache memory, then reading the requested blocks of information from the cache memory and transferring the requested blocks of information to the host computer.

16. The method of claim 15 wherein if the requested blocks of information are not stored in the cache memory, then further comprising steps of:

(g) reading the requested blocks of information from a plurality of discs in the disc drive;

(h) reading excess blocks of information from the discs;

(i) writing the requested and excess blocks of information to the cache memory to fill a segment of the cache memory;

(j) updating the cache table to identify the requested and excess blocks of information written to the cache memory; and (k) transferring the requested blocks of information to the host computer.

17. A disc controller comprising:

a cache memory;

a control circuit to control operations of the disc controller and the cache memory; and means for selecting a segmentation level for the cache memory.

* * * * *